United States Patent
Woodard

(10) Patent No.: US 12,440,228 B2
(45) Date of Patent: Oct. 14, 2025

(54) METHODS AND APPARATUS FOR GUIDING A K-WIRE

(71) Applicant: WRIGHT MEDICAL TECHNOLOGY, INC., Memphis, TN (US)

(72) Inventor: Joseph Ryan Woodard, Memphis, TN (US)

(73) Assignee: WRIGHT MEDICAL TECHNOLOGY, INC., Memphis, TN (US)

( * ) Notice: Subject to any disclaimer, the term of this patent is extended or adjusted under 35 U.S.C. 154(b) by 848 days.

(21) Appl. No.: 17/659,921

(22) Filed: Apr. 20, 2022

(65) Prior Publication Data

US 2022/0371162 A1  Nov. 24, 2022

Related U.S. Application Data

(60) Provisional application No. 63/191,426, filed on May 21, 2021.

(51) Int. Cl.
  *A61B 17/17* (2006.01)
  *A61B 17/16* (2006.01)
  *A61B 17/88* (2006.01)

(52) U.S. Cl.
  CPC .......... *A61B 17/17* (2013.01); *A61B 17/1622* (2013.01); *A61B 17/1697* (2013.01); *A61B 17/8897* (2013.01)

(58) Field of Classification Search
  CPC .................................................... B25B 21/007
  See application file for complete search history.

(56) References Cited

U.S. PATENT DOCUMENTS

| | | | |
|---|---|---|---|
| 7,186,257 B2 | 3/2007 | Kim | |
| 2004/0249389 A1* | 12/2004 | Kim | A61B 17/1622 606/96 |
| 2009/0228031 A1* | 9/2009 | Ritter | A61B 17/1635 606/167 |
| 2013/0307529 A1 | 11/2013 | Baumgartner | |
| 2016/0022284 A1* | 1/2016 | Lele | A61B 17/162 606/91 |
| 2017/0150973 A1* | 6/2017 | Kwon | A61B 17/1695 |
| 2019/0029697 A1* | 1/2019 | Anderson | A61B 17/1622 |

FOREIGN PATENT DOCUMENTS

EP  2777555 B1  7/2016

OTHER PUBLICATIONS

Extended European Search Report issued in connection with European Patent Application No. 22170075.0, Jan. 25, 2023, 10 pages.

* cited by examiner

*Primary Examiner* — Tessa M Matthews
(74) *Attorney, Agent, or Firm* — DUANE MORRIS LLP

(57) ABSTRACT

The disclosed subject matter relates to a visual guide for aiding the surgeon in the insertion of a k-wire. The guide including a ring for receiving a guide wire, the guide wire extending from the ring parallel to the center axis of the ring; and, a ring attachment mechanism configured to attach the visual guide to a wire driver. The guide wires representing the trajectory of the k-wire in two orthogonal planes thus allowing the surgeon to free hand the insertion by visually referencing the guide wires and the actual trajectory of the k-wire within the bone.

16 Claims, 7 Drawing Sheets

METHODS AND APPARATUS FOR GUIDING A K-WIRE

CROSS-REFERENCE TO RELATED APPLICATION

This application claims priority under 35 U.S.C. § 119(e) to U.S. Provisional Application No. 63/191,426, filed May 21, 2021, the entirety of which is incorporated by reference herein.

TECHNICAL FIELD

The disclosed subject matter relates generally a visual aid to assist an orthopedic surgeon when inserting a k-wire into a patient bone.

BACKGROUND

During any surgery, and minimally invasive surgery in particular, surgeons utilize Kirschner wires ("k-wires") to both stabilize the position of bones and to serve as guidewires for screw insertion. It is not uncommon for surgeons to require multiple k-wire insertions before they place the wire into the desired position. However, repeated k-wire insertions require time, increase frustration during the procedure, and represent micro-injuries to the bone that the body must heal in addition to the surgical correction.

There are currently a number of guides on the market to improve k-wire insertion, however, most focus on a specific procedure and require some means for physical attachment to the foot, thus restricting "freehand" methods. For these reasons it would be beneficial to both the surgeon and patient to reduce the number of k-wire insertions performed during a procedure, and thus there remains a need for an improved apparatus to aid in k-wire insertion.

SUMMARY

The embodiments described herein are directed to a system, apparatus and method for k-wire insertion. In addition to or instead of the advantages presented herein, persons of ordinary skill in the art would recognize and appreciate other advantages as well.

In some embodiments, a system for positioning a k-wire in a bone(s) is presented. The system includes a wire driver having a chuck engaging a surgical k-wire, the wire driver configured to rotate the chuck and surgical k-wire about the longitudinal axis of the k-wire. Also included is a guide wire extending from the wire driver; the guide wire being laterally offset from the surgical k-wire and having a longitudinal axis parallel with the longitudinal axis of the k-wire. The guide wire in the system extending longitudinally from the chuck at least as far as the surgical k-wire extends longitudinally from the chuck. In the system the guide wire may be permanently attached to the wire driver or may be part of a guide which is removably attached to the wire driver.

In some embodiments, a method is provided that aids in the insertion of a k-wire into a bone. The method includes inserting a surgical k-wire into the chuck of a wire driver; attaching a guide with a guide wire on to the wire driver; where the guide wire extends from the guide and is parallel with the surgical k-wire. The method further includes positioning the surgical k-wire at the intended insertion point; and aligning a plane defined by the surgical k-wire and the guide wire with a desired trajectory in one of the lateral and A-P planes; and, inserting the surgical k-wire into the bone while maintaining the desired trajectory via visual reference back to the guide wire.

In yet another embodiment, a visual guide for insertion of a k-wire is presented. The guide having a ring with at least a first guide wire attachment mechanism connecting a guide wire to the ring, the guide wire extending from the ring parallel to the center axis of the ring; and, a ring attachment mechanism configured to attach the visual guide to a wire driver used for insertion of k-wires.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1B:
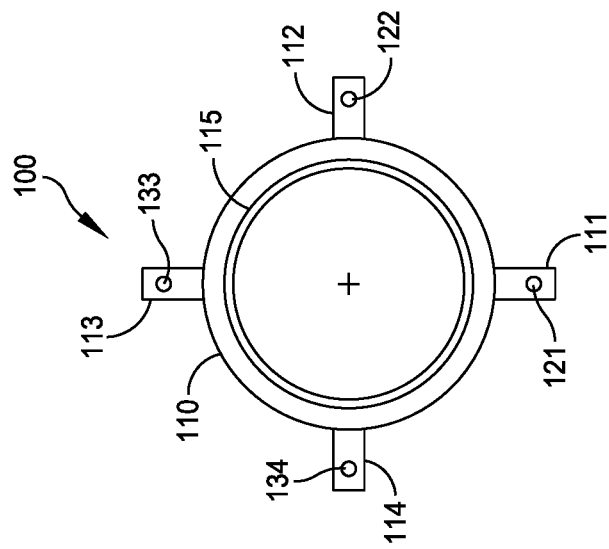
FIGS. 1A-1C are illustrations of a k-wire insertion guide in accordance with some embodiments of the disclosed subject matter.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, or otherwise, such that the connection allows the pertinent devices or components to operate with each other as intended by virtue of that relationship.

Figure 1A:
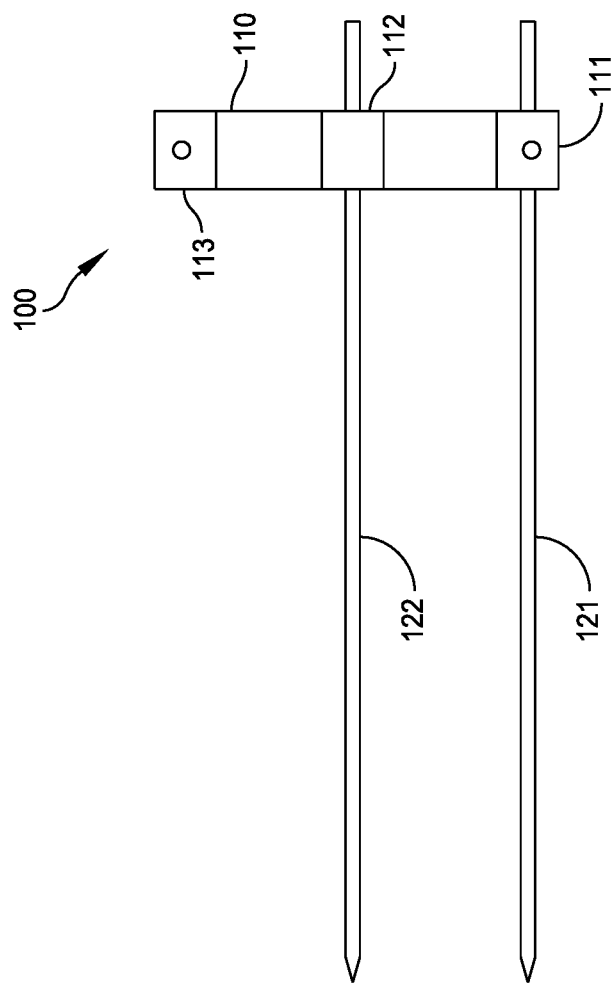

Turning to the drawings, FIG. 1A illustrates a top view of a k-wire insertion guide 100. The guide 100 includes a ring or bezel (receiver) 110 with one or more wire attachment and retention points 111, 112, 113 and 114 as shown in FIG. 1B. While the receiver 110 is shown as a ring, other shapes are envisioned as well, for example the receiver 110 may be in the form of a polygon or portion thereof, or may be a frame/lattice connecting and fixing the attachment points with respect to the wire driver. The wire attachment points 111-114 retain one or more guide wires, preferably readily available k-wires. FIG. 1A shows a dorsal wire guide 122 retained to the ring 110 via attachment point 112 and a medial guide wire 121 retained to the ring 110 via attachment point 111. While only dorsal and medial guide wires are shown, it is envisioned that additional guide wires may also be attached via attachment points 113 and 114, which may help the surgeon to more readily visualize the desired planes. The guide 100 with the medial guide wire 121 located at attachment point 111, may be considered a right handed set up, while attaching the medial guide wire via attachment point 113 would be considered a left handed set up, in that the medial guide wire would be more readily observable by the surgeon when used with the right hand and left hand respective. The guide wires are preferably removable but may also be permanently affixed to the ring 110. If removable, the surgeon may use a variety of sizes of k-wire to match the surgically inserted k-wire of choice, and the guide wires may be secured to guide ring 110 via ball plungers, compression fit with rubber ring, ball seals, spring-action button, zip-tie-like features, collets, clamps, straps, snap features, or set screws.

The four attachment points 111-114 may be seen in the front view of the guide in FIG. 1B. The guide wires 121 and 122 are shown in attachment points 111 and 112, respectively while groove/slots 133 and 134 are shown respectively in attachment points 113 and 114 which may also receive guide wires if desired. Each of the attachment points is 90 degrees from adjacent attachment points such that the respective planes they define are orthogonal. Greater numbers of attachment points are envisioned representing multiple pairs of attachment points that are 90 degrees offset. Within the ring 110 is a rubberized sleeve 115 (also shown in FIG. 1C) used to frictionally/compressively attach the guide 100 to a wire driver (not shown). Other mechanism to attach the guide include ratcheted straps (zip ties), screws (threaded fasteners), collets, snaps, magnets, belts, bayonet fittings, bosses, clamps, keys (keyway), boss(es) and ball plungers as well as mechanisms available to those skilled in the art that allow the guide 100 to be easily and removably attached to the wire driver.

Figure 1C:
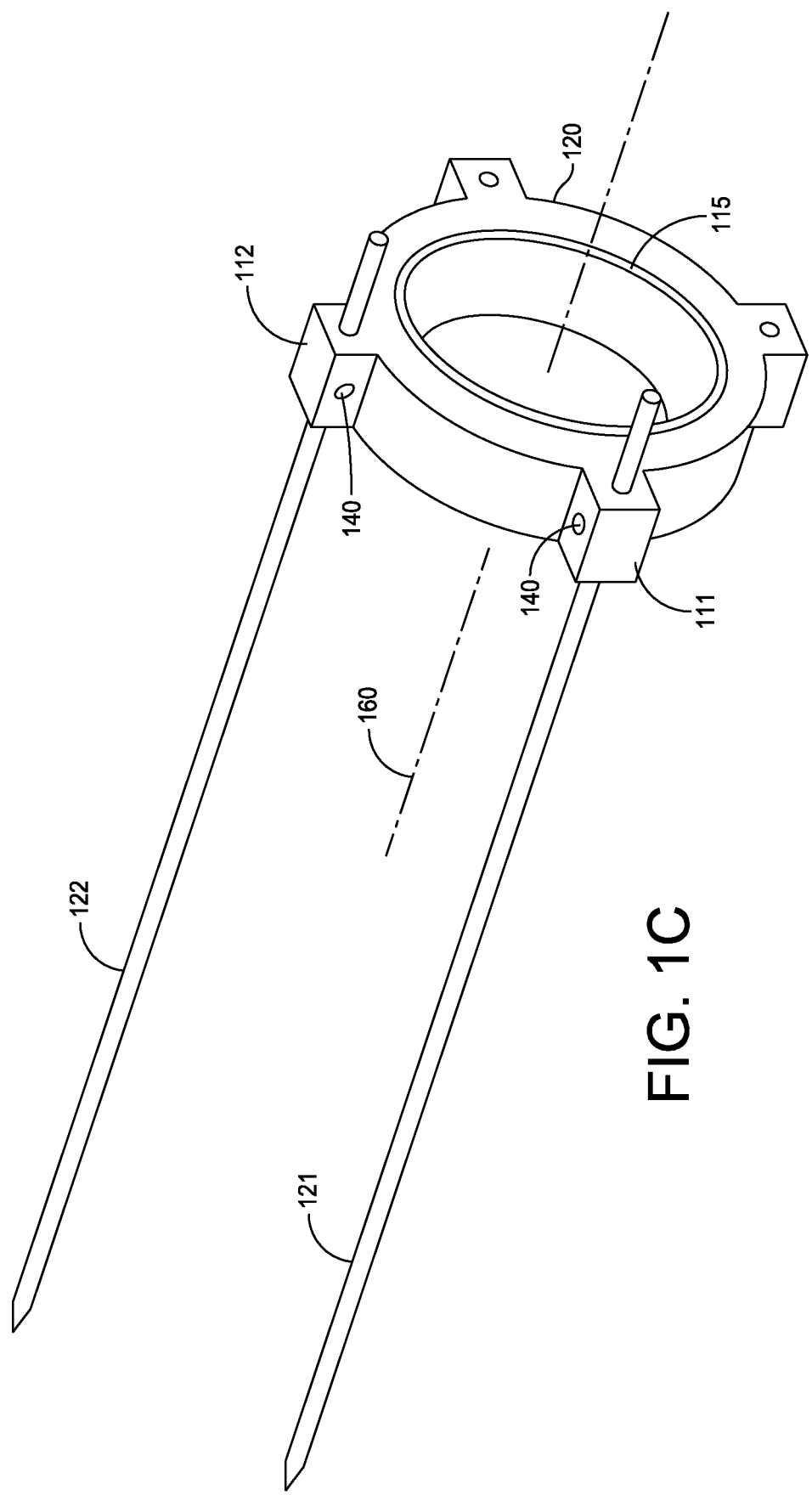

In FIG. 1C, set screws 140 are shown attaching the guide wires 121 and 122 to the attachment points 111 and 112, respectively and thus to the ring 110. The ring 110 has a central axis 160 which is coincident with the k-wire to be inserted with the wire driver. The guide wires extend from the ring 110 parallel to the center axis 160 of the ring 110.

Figure 2:
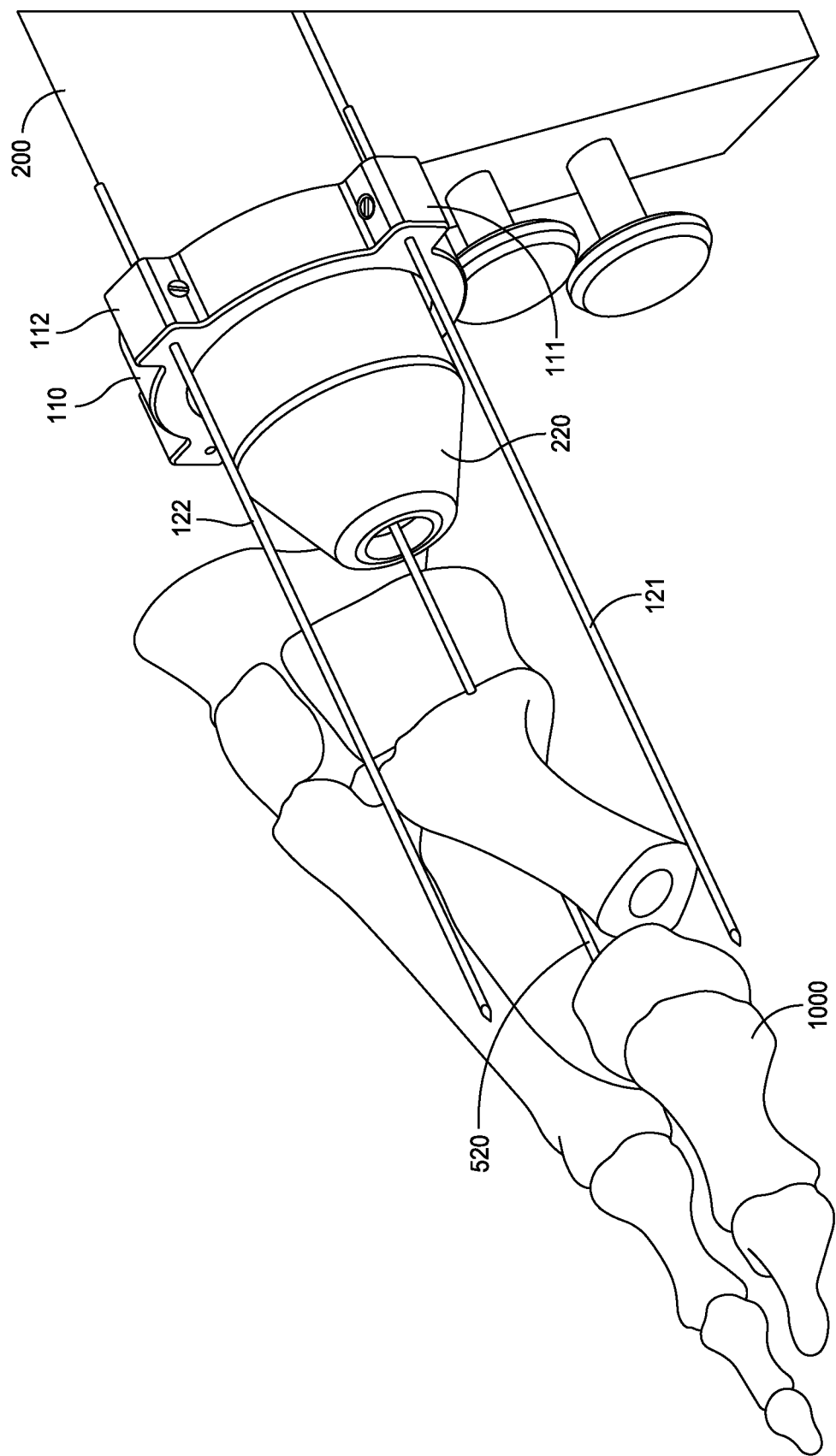
FIG. 2 is an isometric illustration of a k-wire insertion guide attached to a wire driver in accordance with some embodiments of the disclosed subject matter.
Figure 3:
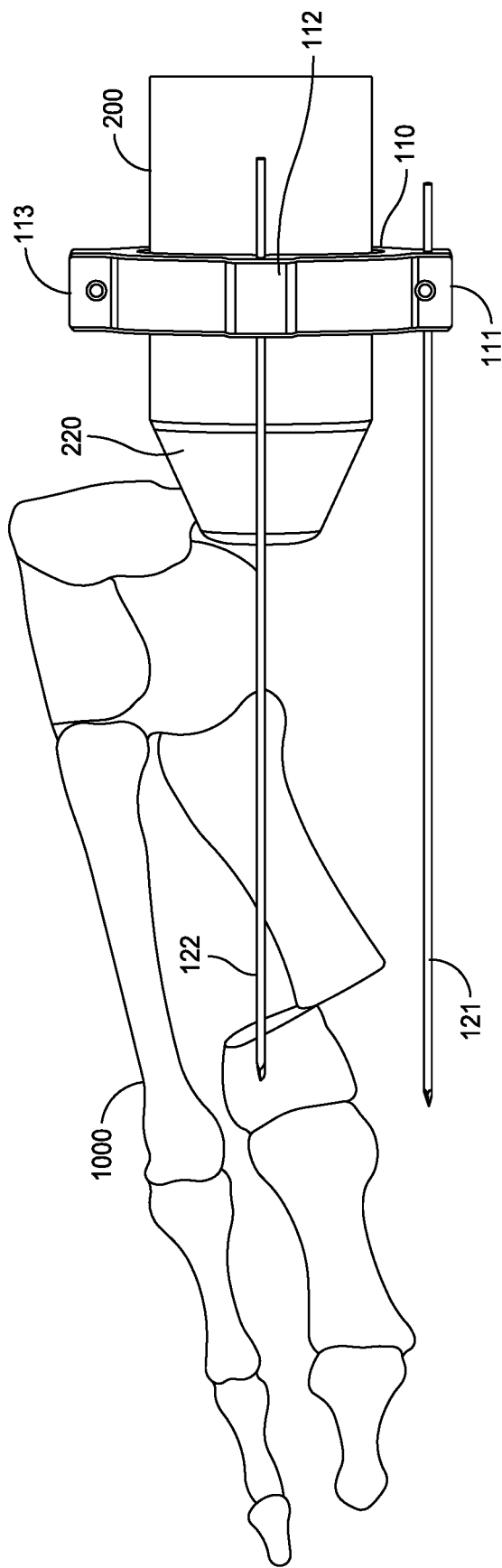
FIG. 3 is a top view of a k-wire insertion guide attached to a wire driver in accordance with some embodiments of the disclosed subject matter.
Figure 4:
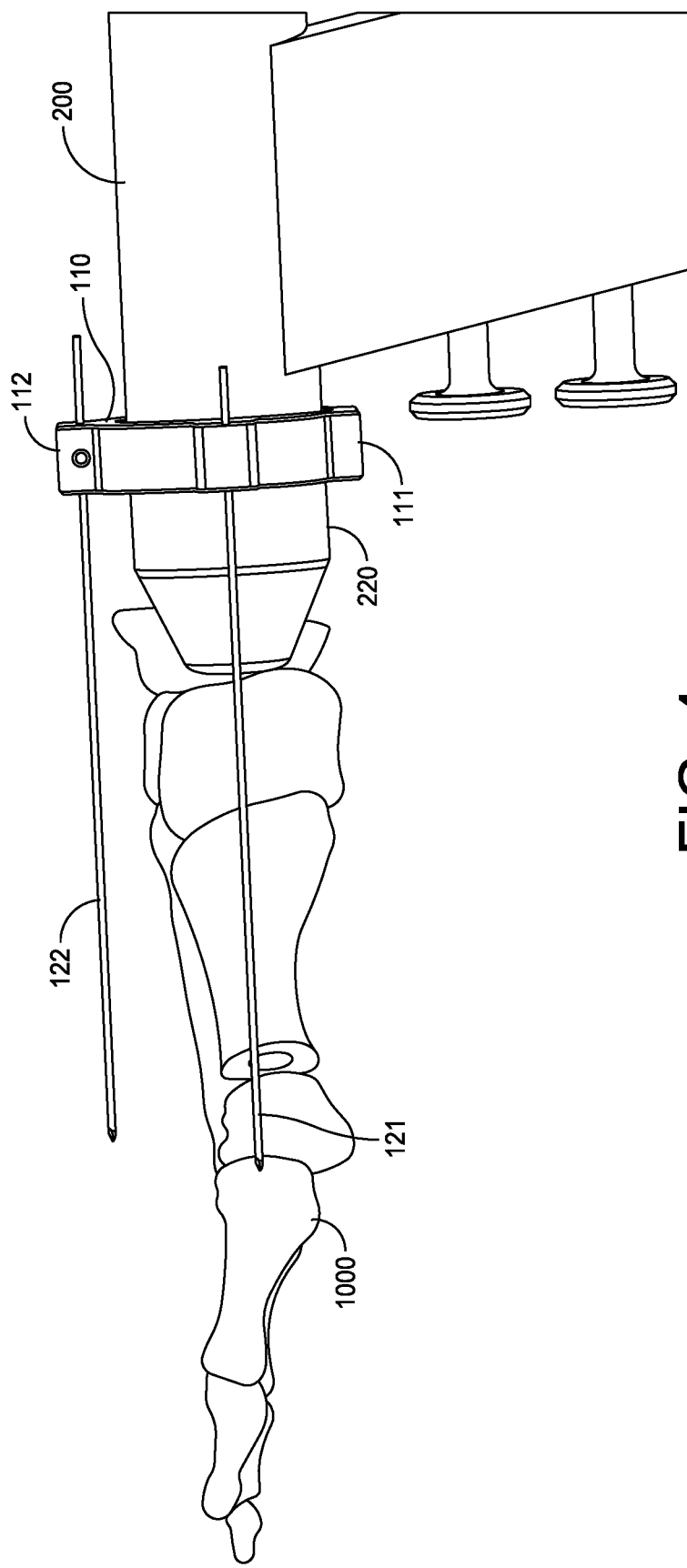
FIG. 4 is a side view of a k-wire insertion guide attached to a wire driver in accordance with some embodiments of the disclosed subject matter.

The guide 100 engages the wire driver 200 over and past the chuck 220 as shown in FIG. 2. Using the guide 100 enables the surgeon to visualize the relative position of the surgical k-wire 520 within the bone 1000. FIG. 3 illustrates an anterior posterior (A-P) view, i.e. looking down upon the bone 1000 (foot). The dorsal guide wire 122 and the center axis 160, which is coincident with the surgical k-wire 520, define a plane that when oriented perpendicular to the lateral plane superimposes the dorsal guide wire 122 on the lateral trajectory of the inserted k-wire 520. Thus the location and movement of the inserted k-wire 520 in the lateral plane may be represented by the dorsal guide wire 122. Likewise, in FIG. 4, the plane defined by the medial guide wire 121 and the center axis 160 when perpendicular to the A-P plane, the location and movement of the inserted k-wire 520 in the A-P plane is represented by the medial guide wire 121. Thus between the top and side views of FIGS. 3 and 4 respectively, the location and trajectory of the inserted k-wire 520 may be represented in three dimensions and thus monitored and controlled using the two guide wires 121, 122 allowing the surgeon to freehand the insertion without the physical restrictions of prior art guides.

Figure 5A:
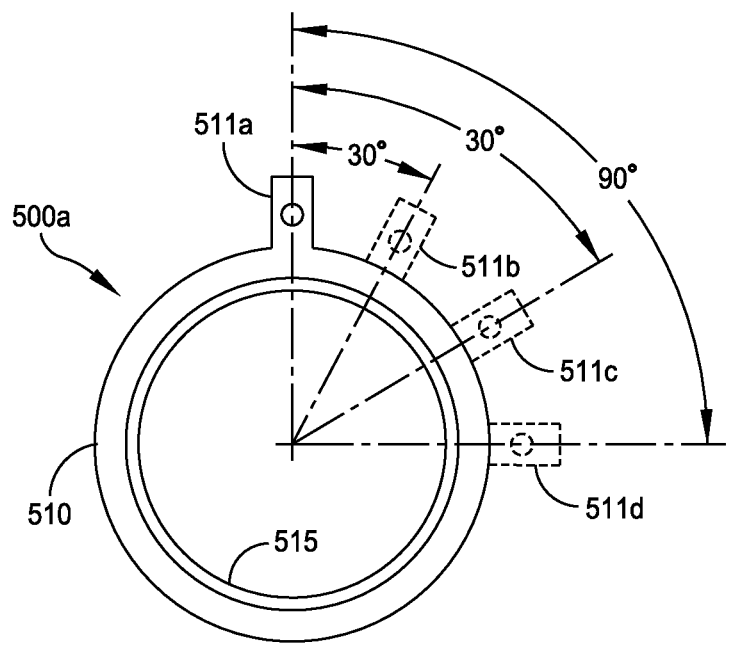
FIGS. 5A and 5B illustrate alternative embodiments of the k-wire insertion guide of the disclosed subject matter; and, FIG. 6 is a flow chart of a method of inserting a k-wire in accordance with embodiments of the disclosed subject matter.

Alternatively, the guide 500a may include one attachment point 511 on the ring 510, which may be rotated concentrically about the attachment device 515 of the guide 500a which is rigidly secured to the wire driver 200. Particularly, the ring 510 may be incremented to rotate in 90 degree increments, such that that the two positions 511a and 511d of the attachment points are orthogonal. Additionally, the ring 510 may be incremented in smaller angular factors of 90 degrees, such 1, 3, 10, 15 or 30 degrees. FIG. 5A illustrates location 511b at 30 degrees, and 511c with is at two 30 degree increments. While not shown the attachment point 511 may be incremented thru 360 degrees to allow customization of the orientation of the two orthogonal planes with respect to the wire driver 200. Each increment may be biased into position with known methods such as stop points achieved using teeth or ball plungers so that it clicks into a plurality of positions radially about the portion rigidly secured to the wire driver 200. In this embodiment the surgeon may utilize only one guide wire, inserted into the one attachment point 511, and then rotate the ring 510 and thus attachment point 511 so that the guide wire may be used to check the surgical k-wire's position sequentially in both AP and lateral planes.

Figure 5B:
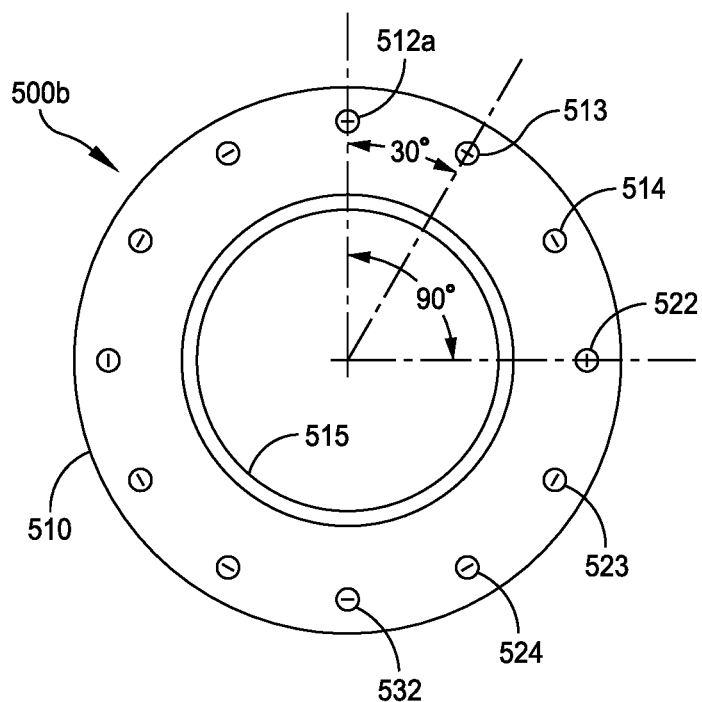

Another embodiment of the guide 500b is shown in FIG. 5B. Rather than the attachment points in FIG. 1B in which they are 90 degrees offset, a plurality of hole pairs compatible with receiving and frictionally, or otherwise, retaining the guide wires may be disposed radially about the circumference of the ring 510. The holes may be incremented by factors of 90 degrees, 45, 30, 15, 10, 5 or 3 degrees (limited only by the available space and the ability for the surgeon to identify the matched pairs). As shown in FIG. 5B, the holes are incremented at 30 degrees, such that pair 512 and 522 forms a first pair offset by 90 degrees, attachment points 513, 523 and 514, 524 form additional pairs 90 degrees offset, and 522 and 532 form yet another 90 degree pair, etc. Preferably the associated pair may be color coded or labeled to enable the surgeon to select the attachment points forming each pair. For example, attachment points 512 and 522 would be associated with red indicia, while pair 513 and 523 would have blue indicia. The ring 510 with the hole pairs in this embodiment allows the surgeon to choose the most appropriate pair of attachment points for the intended use. Additionally, the ring 510 in FIG. 5B may also be rotatable with respect to the attachment sleeve 515 to allow further adjustment.

Figure 6:
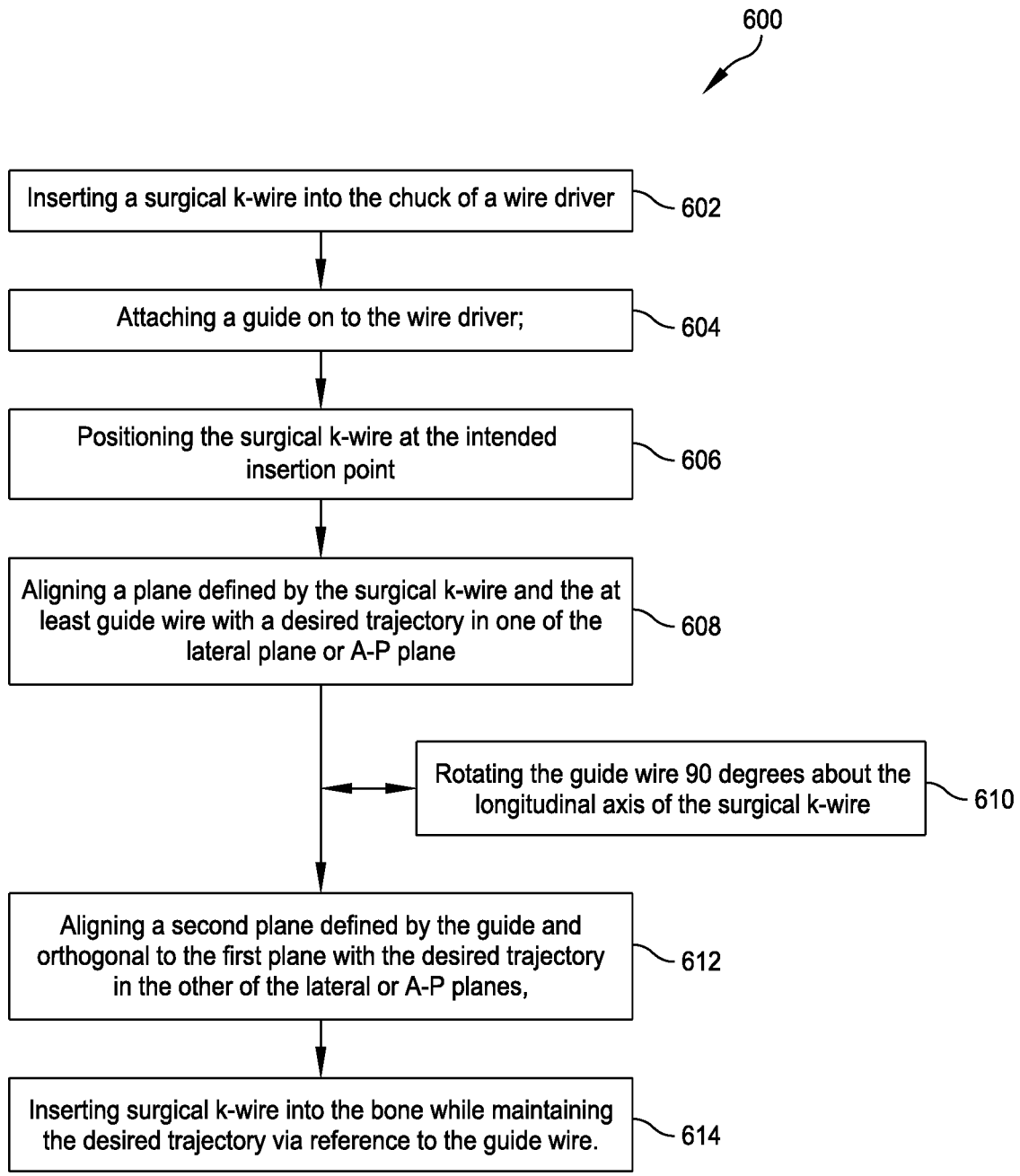

FIG. 6 illustrates a method 600 of inserting a surgical k-wire using the disclosed guide. The wire driver 200, used in the disclosed method includes a chuck 220 in which a surgical k-wire or bit is retained. The k-wire is inserted into the chuck 220 of the wire driver 200 as shown in Block 602, the guide is then attached to the wire driver 200 over the chuck 220 as shown in Block 604. The guide, as discussed above, has one or more guide wires that extend parallel to the surgical k-wire as serve as representations of the surgical k-wire within the respective planes, to assist in its proper insertion. The surgical k-wires is positioned at the intended insertion point as shown in Block 606. Aligning the plane defined by one of the guide wires and the surgical k-wire, with the desired trajectory in a perpendicular plane for example one of the lateral or A-P planes as shown in Block 608. Then aligning another plane perpendicular to the first and defined by a guide wire and the surgical k-wire with the desired trajectory with yet another orthogonal plane (the other of the lateral or A-P planes) as shown in Block 612. The surgeon checks position in both A-P and lateral planes using guide wire ring to determine trajectory of surgical k-wire and adjusts hand position as needed. These latter steps typically require use of fluoroscopy to confirm intended trajectory has been achieved. The surgical k-wire is advanced into the bone while maintaining the desired trajectory in each of the lateral and A-P planes with reference to the respective guide wires as shown in Block 614. The surgical k-wire may be advanced incrementally and its position and orientation verified via the guide wires as it is advanced.

In the embodiments using only one guide wire, it is necessary to rotate the guide wire 90 degrees about the longitudinal axis of the surgical k-wire to define the second plane as shown in Block 610. As noted, a fluoroscope is preferably used to visualize the bone and the surgical k-wire with reference to the guide wires. Thus, it is preferable that the guide wires are not X-ray permeable, so that they will appear on the fluoroscope. Ideally, as described previously, readily available k-wires of selectable sizes may be used as the guide wires, which have this characteristic An aspect of the disclosed subject manner is that it may be used anywhere on the foot for any procedure, as well as other body parts, and the guide does not require physical attachment to the foot or bone in which the k wires is being inserted. The disclosed subject matter serves as a stepping stone to the "freehand" method wherein a surgeon inserts a wire without the need for guides physically registered to the bone. Therefore, this method is much closer to the end goal of many surgeons, which is unassisted k-wire insertion with a low incidence of misplacement.

Another aspect of the disclosed subject matter is than any set of orthogonal planes may be used to visualize the insertion of the k-wire with the guide wires. The use of dorsal and medial guide wires is for example only and is not intended to be limiting. Additionally, while it is preferred that the planes are orthogonal as they provide two independent frames well understood by the surgeon, non-orthogonal planes may also be used; however, their practical use may not meet the theoretical possibilities.

Yet another aspect of the disclosed subject matter is that while wire is used in describing the visual guides (guide wires, rods), the guides may also be any narrow elongated straight rod, strip or bar that achieve the desired goal of visually referencing the position of the surgical k-wire being inserted. Examples may be rods formed from plastic, ceramic, metal or organic material, or composites thereof. For materials that are x-ray permeable, non-permeable material may be added to enable the guide to be visible under a fluoroscope.

Although the methods described above are with reference to the illustrated flowchart, it will be appreciated that many other ways of performing the acts associated with the methods can be used. For example, the order of some operations may be changed, and some of the operations described may be optional.

The foregoing is provided for purposes of illustrating, explaining, and describing embodiments of these disclosures. Modifications and adaptations to these embodiments will be apparent to those skilled in the art and may be made without departing from the scope or spirit of these disclosures.

The invention claimed is:

1. A system for positioning a K-wire, comprising:
a wire driver having a chuck engaging a surgical k-wire, the wire driver configured to rotate the chuck and surgical k-wire about the longitudinal axis of the k-wire;
a guide rod extending from the wire driver; the guide wire rod laterally offset from the surgical k-wire and having a longitudinal axis parallel with the longitudinal axis of the k-wire;
a receiver removably attached to the wire driver including a receptacle for the guide rod configured to rotate through at least 90 degrees about a center axis of the receiver; and,
the guide rod extending longitudinally from the chuck at least as far as to overlap a portion of the surgical k-wire that extends longitudinally from the chuck.

2. The system of claim 1, wherein the guide rod is a k-wire.

3. The system of claim 1, wherein the guide rod is removably attached to the wire driver.

4. The system of claim 1, wherein the guide rod is positionable with respect to the wire driver at a first position and a second position, the first and second positions being separated substantially 90 degrees about the longitudinal axis of the surgical k-wire.

5. The system of claim 1, further comprising a second guide rod, the second guide rod positioned substantially 90 degrees from the guide wire about the longitudinal axis of the surgical k-wire.

6. The system of claim 1, further comprising a second guide rod, the second guide wire 180 degrees offset from the guide rod.

7. The system of claim 6, wherein the second guide wire and the guide rod are rotatable about the longitudinal axis of the surgical k-wire by at least 90 degrees.

8. A method of inserting a K-wire into a bone comprising:
inserting a surgical k-wire into a chuck of a wire driver;
attaching a guide with at least one guide rod on to the wire driver; the guide rod extending from the guide and parallel with the surgical k-wire;
positioning the surgical k-wire at the intended insertion point;
aligning a plane defined by the surgical k-wire and the at least one guide rod with a desired trajectory in one of the lateral and A-P planes; and,
inserting surgical k-wire into the bone while maintaining the desired trajectory via reference to the guide rod;
aligning a second plane defined by the surgical k-wire and a second guide rod with the desired trajectory in the other of the lateral and A-P planes, the second guide rod offset from the at least one guide rod by 90 degrees.

9. The method of claim 8, wherein the at least one guide rod is integral with the guide.

10. The method of claim 8, wherein the step of attaching a guide further comprises attaching the at least one guide rod to the guide.

11. The method of claim 8, further comprising rotating the at least one guide rod 90 degrees about the longitudinal axis of the surgical k-wire and aligning a second plane orthogonal to the first plane with the desired trajectory in the other of the lateral and A-P planes, the second plane including the surgical k-wire and the at least one guide rod.

12. A visual guide for insertion of a k-wire; comprising:
a receiver having a first guide rod attachment mechanism;
a guide rod connected to a ring by the guide rod attachment mechanism, the guide rod extending from the receiver parallel to the center axis of the receiver and the receiver is rotatably connected to a receiver attachment mechanism, wherein the receiver is configured to rotate through at least 90 degrees about the center axis of the receiver; and, a receiver attachment mechanism configured to attach the visual guide to a wire driver.

13. The visual guide of claim 12, wherein the rotation of the receiver is indexed at increments selected from the group of 90 degrees, 30 degrees, 10 degrees, 5 degrees, 3 degrees and 1 degree intervals.

14. The visual guide of claim 12, wherein the first guide rod attachment mechanism is selected from the group consisting of a collet, chuck, ball plunger, sleeve, clamp, snap, set screw latch, leaf spring and spring.

15. The visual guide of claim 12, wherein the receiver attachment mechanism is selected from the group consisting of a collet, a sleeve, a strap, a clamp, a bayonet fitting, magnet, ball plunger, latches, mechanical snaps, threaded fasteners and a key.

16. The visual guide according to claim 12, wherein the guide rod further comprises indicia of length along the guide wire.

\* \* \* \* \*